(12) United States Patent
Binder et al.

(10) Patent No.: US 9,114,934 B2
(45) Date of Patent: Aug. 25, 2015

(54) SPINDLE CONVEYOR AND PLANT FOR TREATING WORKPIECES HAVING SUCH A SPINDLE CONVEYOR

(75) Inventors: Dietmar Binder, Holzgerlingen (DE); Ulrich Hofbauer, Gaefelden (DE)

(73) Assignee: EISENMANN AG, Boeblingen (DE)

( * ) Notice: Subject to any disclaimer, the term of this patent is extended or adjusted under 35 U.S.C. 154(b) by 2 days.

(21) Appl. No.: 13/261,774

(22) PCT Filed: Apr. 26, 2012

(86) PCT No.: PCT/EP2012/001779
§ 371 (c)(1),
(2), (4) Date: Dec. 18, 2013

(87) PCT Pub. No.: WO2012/152379
PCT Pub. Date: Nov. 15, 2012

(65) Prior Publication Data
US 2014/0299444 A1 Oct. 9, 2014

(30) Foreign Application Priority Data
May 7, 2011 (DE) .......... 10 2011 100 826

(51) Int. Cl.
*B65G 17/18* (2006.01)
*B65G 17/48* (2006.01)
*B65G 45/22* (2006.01)
(Continued)

(52) U.S. Cl.
CPC .............. *B65G 17/48* (2013.01); *B61B 10/04* (2013.01); *B65G 45/22* (2013.01); *B65G 47/18* (2013.01); *B65G 47/244* (2013.01); *B65G 2207/38* (2013.01); *B65G 2811/0626* (2013.01)

(58) Field of Classification Search
CPC ...... B65G 17/18; B65G 45/22; B65G 47/244; B65G 2811/0626; B65G 17/48; B65G 2207/38; B61B 10/04
USPC ............ 198/487.1, 867.09, 803.12, 494–495, 198/465.1–465.4, 375, 377.01–377.06, 198/377.1, 378, 416
See application file for complete search history.

(56) References Cited

U.S. PATENT DOCUMENTS 3,367,472 A 2/1968 Rossi
4,297,205 A * 10/1981 Mieville ........................ 208/138
(Continued)

FOREIGN PATENT DOCUMENTS

DE 1 577 903 1/1970
DE 296 10 702 10/1997
DE 10 2004 057 445 11/2004

*Primary Examiner* — Mark A Deuble
(74) *Attorney, Agent, or Firm* — Factor Intellectual Property Law Group, Ltd.

(57) ABSTRACT

In a spindle conveyor for conveying workpieces, in particular vehicle wheels, there is a rail system which includes at least one supporting rail. A plurality of transport carriages each have a chassis that is able to move on the supporting rail in a transporting direction and a carrying device for workpieces carried along by the chassis. The carrying device includes at least one workpiece spindle for receiving the workpiece and which is pivotable, at least in a particular section of the spindle conveyor, between a conveying position and a particular position different from the conveying position wherein the workpiece spindle is tilted in the particular position with respect to a vertical plane (V) which extends parallel to the transporting direction. Also, a plant for treating workpieces having such a spindle conveyor which conveys the workpieces through the plant.

10 Claims, 5 Drawing Sheets

(51) Int. Cl.
   *B65G 47/18*      (2006.01)
   *B65G 47/244*     (2006.01)
   *B61B 10/04*      (2006.01)

(56) References Cited

U.S. PATENT DOCUMENTS

| | | | | |
|---|---|---|---|---|
| 4,640,406 A | * | 2/1987 | Willison | ............ 198/377.03 |
| 5,067,414 A | | 11/1991 | Moore et al. | |
| 5,136,834 A | * | 8/1992 | Stadele | ...................... 57/281 |
| 5,174,432 A | * | 12/1992 | Nakagawa et al. | ........ 198/465.1 |
| 5,337,881 A | * | 8/1994 | Kakida et al. | ............... 198/409 |
| 5,971,135 A | | 10/1999 | Heinrich et al. | |
| 6,688,461 B1 | * | 2/2004 | Frazier et al. | ............ 198/867.09 |
| 2003/0005884 A1 | | 1/2003 | Makimura et al. | |
| 2003/0213675 A1 | | 11/2003 | Dooley | |
| 2006/0107968 A1 | | 5/2006 | Schmidt et al. | |
| 2007/0068771 A1 | * | 3/2007 | Nothum et al. | ............ 198/377.1 |
| 2013/0042806 A1 | * | 2/2013 | Buschman et al. | ............ 118/322 |

* cited by examiner

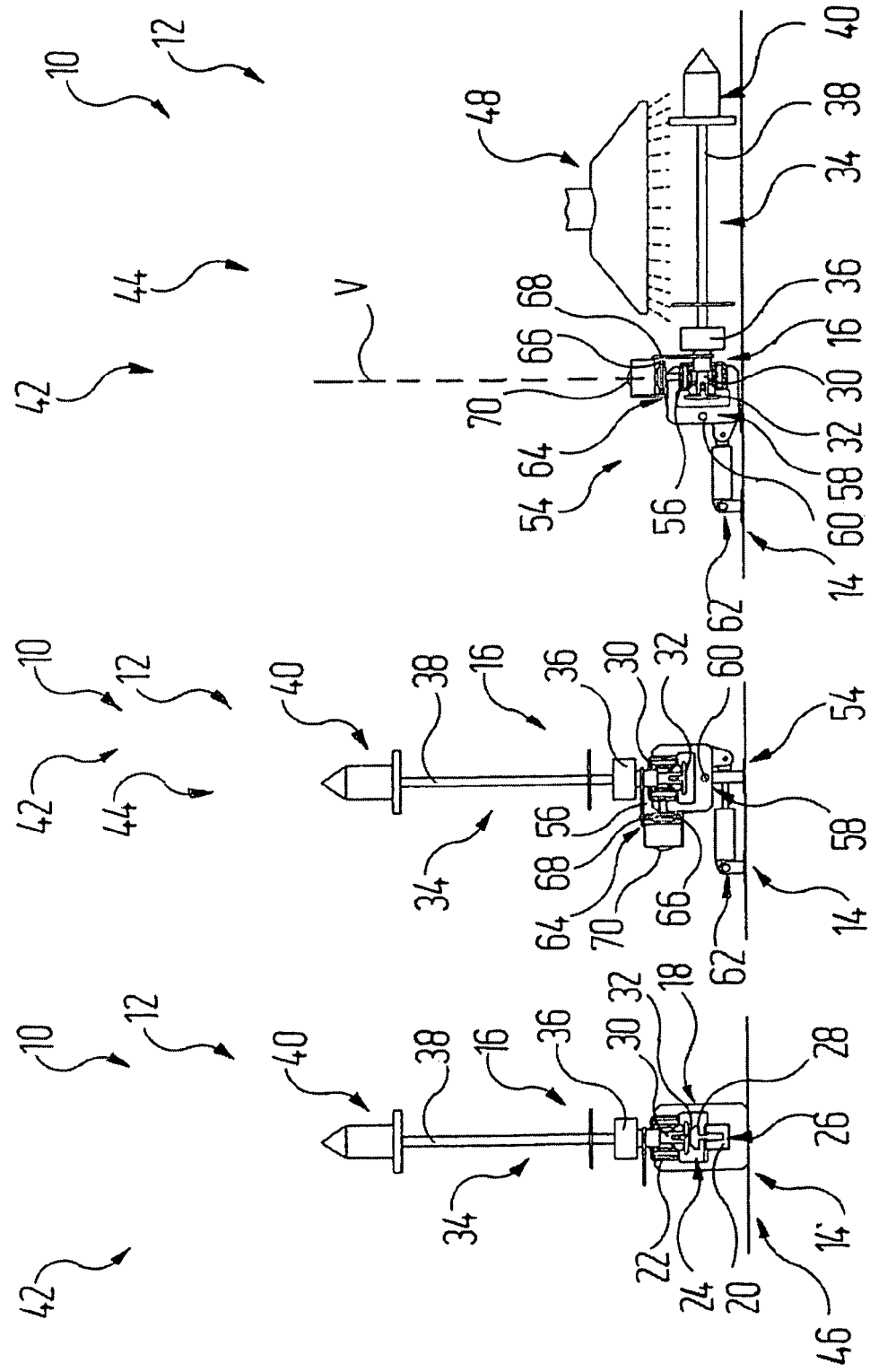

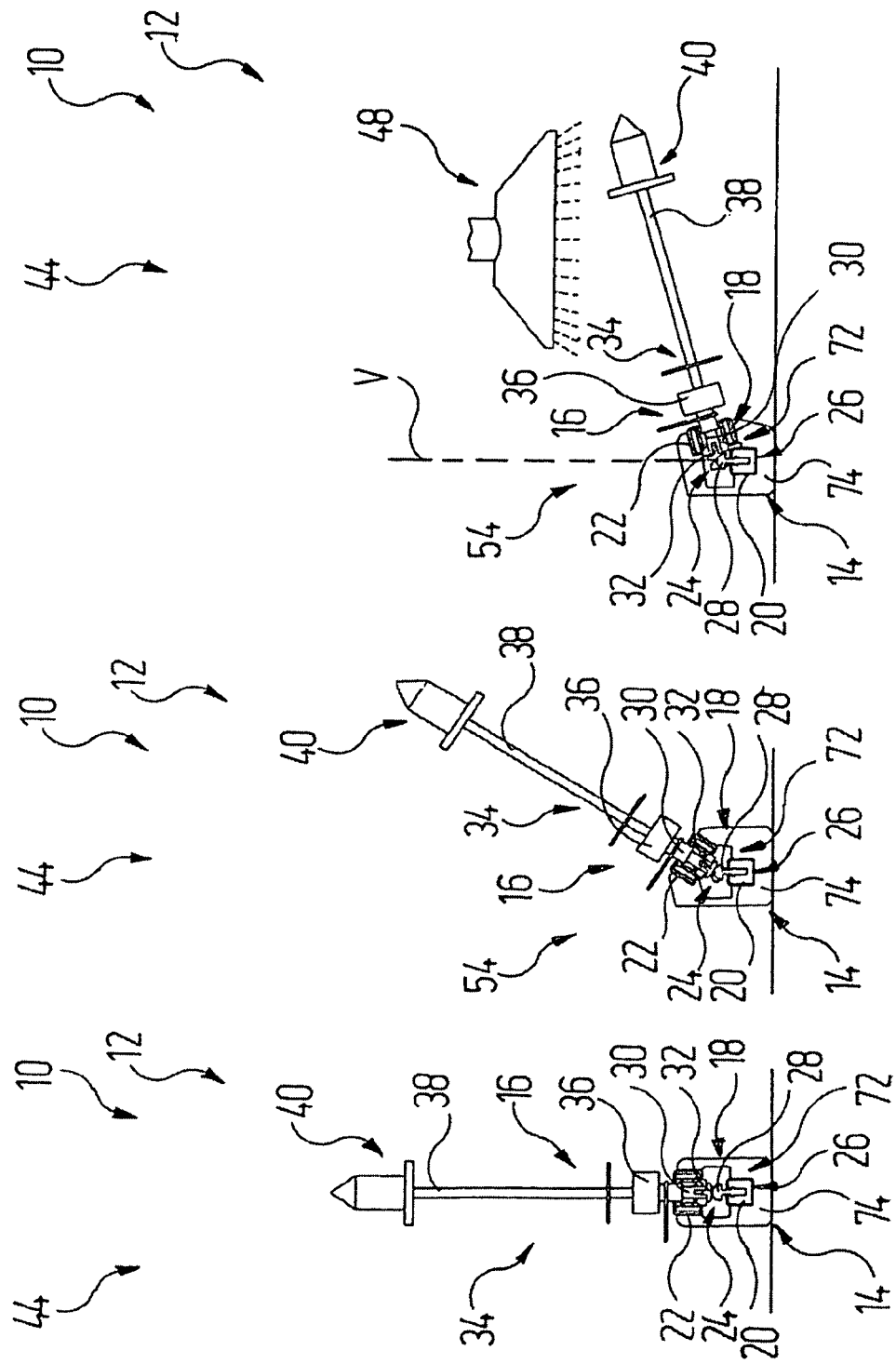

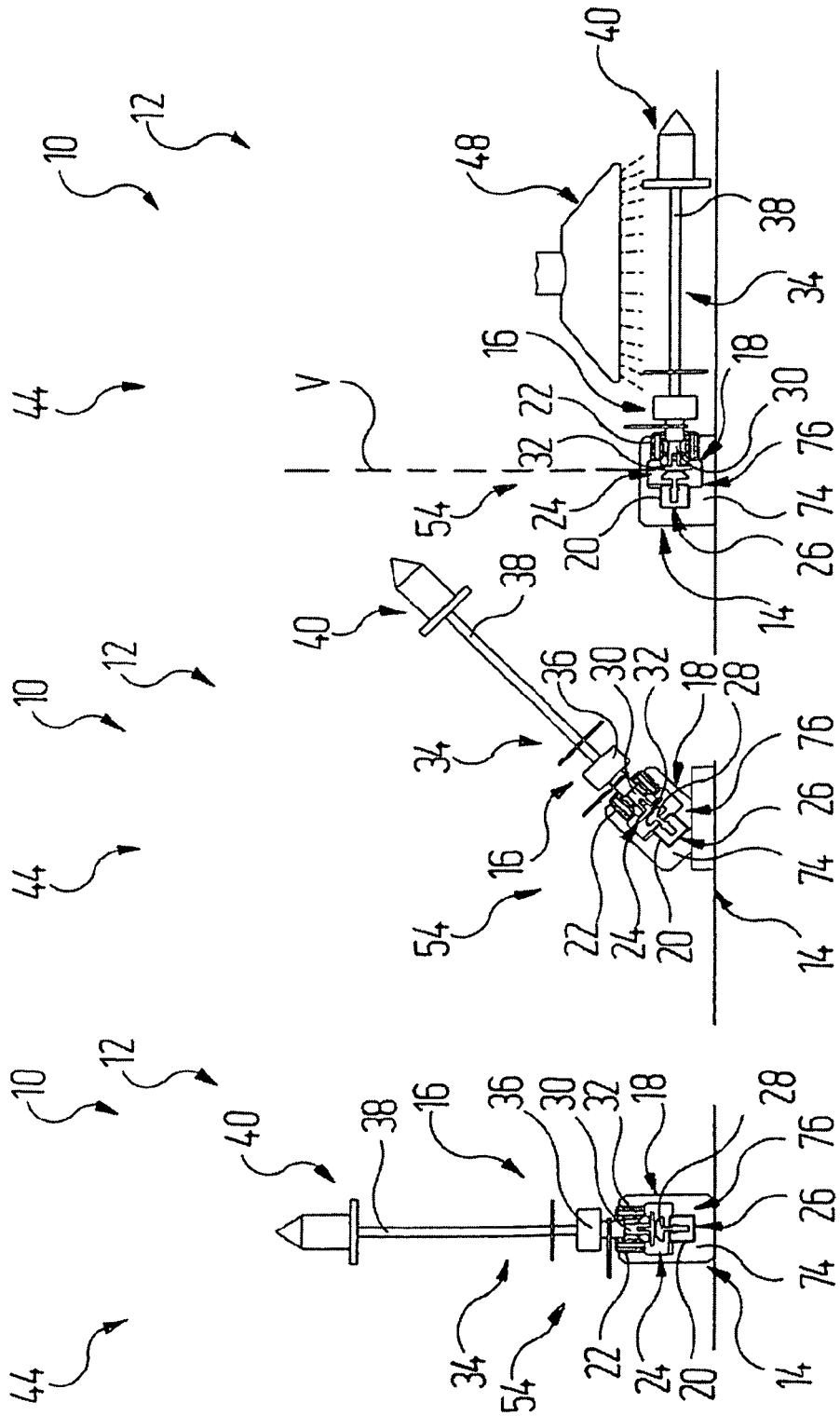

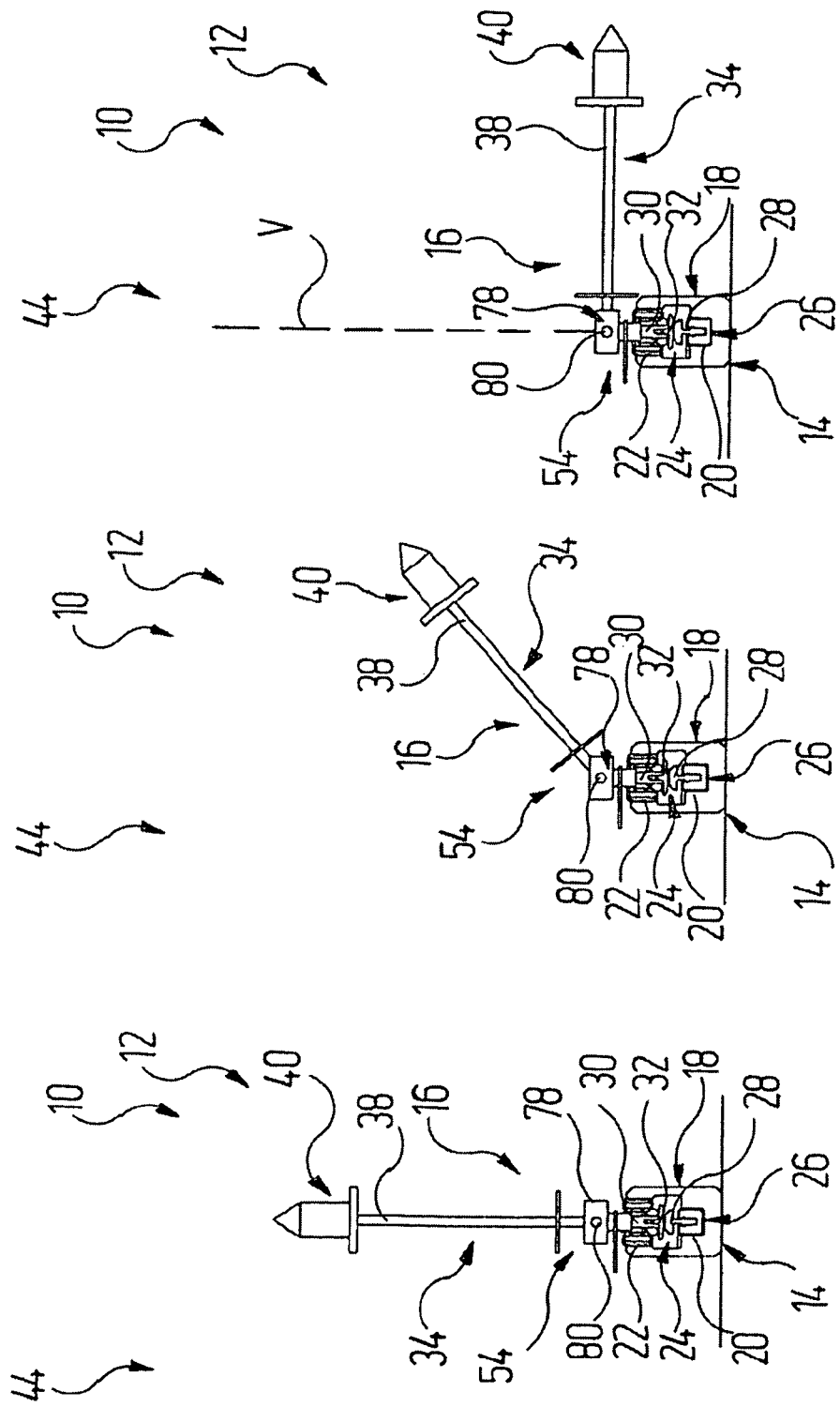

SPINDLE CONVEYOR AND PLANT FOR TREATING WORKPIECES HAVING SUCH A SPINDLE CONVEYOR

RELATED APPLICATIONS

This application claims the filing benefit of International Patent Application No. PCT/EP2012/001779, filed on Apr. 26, 2012, which claims the filing benefit of German Patent Application No. 10 2011 100 826.1, filed May 7, 2011, the contents of both of which are incorporated herein by reference.

FIELD OF THE INVENTION

The invention relates to a spindle conveyor for conveying workpieces, in particular vehicle wheels, having a) a rail system, which comprises at least one supporting rail;

b) a plurality of transport carriages, which each comprise a running gear that is movable on the supporting rail in a transporting direction and a carrying device for workpieces that are carried along by the running gear;

c) the carrying device comprising at least one workpiece spindle for receiving the workpiece.

The invention additionally relates to a plant for treating workpieces, in particular vehicle wheels, having a conveying system by means of which the workpieces can be conveyed through the plant.

BACKGROUND OF THE INVENTION

A workpiece spindle is understood in this case to be any spindle-shaped element that can receive a workpiece, either directly or via a further mounting. If appropriate, a carrying basket for small parts can also be fastened to a workpiece spindle, which small parts, for their part, are placed loosely in this carrying basket. Such a workpiece spindle is normally approximately one meter long, but may also be only a few centimeters long, depending on the type of workpieces to be conveyed.

Spindle conveyors, of the type stated at the outset, that are known from the market are used, in particular, to convey vehicle wheels through successive treatment stations of a coating installation, in which the vehicle wheels are provided with a surface coating in a plurality of treatment steps. In such cases, the workpiece spindles are aligned vertically.

In the treatment stations, the workpiece spindles of the transport carriages also become wetted with coating materials, for which reason these transport carriages have to be cleaned from time to time.

For this purpose, in the case of spindle conveyors known from the market, and plants of the type stated at the outset, the transport carriages are routed through a cleaning station, in which the workpiece spindles are sprayed with a cleaning solution, from the side. Cleaning solution loaded with coating material may then drip down on to the running gear of the transport carriages that is located underneath, or on to the rail system, resulting in after-soiling. This, in turn, increases the amount of servicing and cleaning work, since this soiling, likewise, must be removed.

Alternatively, soiled workpiece spindles are detached from the transport carriages and exchanged for cleaned workpiece spindles.

It is therefore an object of the invention to create a spindle conveyor and a plant of the type stated at the outset, in which there is a reduced risk of after-soiling of the components, in particular in the cleaning operation, in particular if the workpiece spindles remain on the transport carriage during cleaning.

SUMMARY OF THE INVENTION

This object may be achieved, in the case of a spindle conveyor of the type stated at the outset, in that d) the workpiece spindle of a transport carriage located on the rail system is pivotable, at least in a particular portion of the spindle conveyor, between a conveying position and a particular position that is different from the conveying position;

e) the workpiece spindle, when in the particular position, is tilted with respect to a vertical plane that extends parallel to the transporting direction.

The invention therefore enables the workpiece spindle to be tilted sideways, with the result that it can project laterally beyond the inside contour of the running gear of the transport carriage and beyond components of the rail system. Cleaning solution can then be applied to the workpiece spindle from above, and material dripping off the workpiece spindle falls down into a region in which there are now no longer any components or structural parts of the spindle conveyor.

Preferably, the particular portion of the rail system is a cleaning region, in which there is disposed a cleaning device, by means of which the workpiece spindles of the transport carriages can be cleaned. The particular position of the workpiece spindle is therefore preferably a cleaning position.

It is advantageous if there is a tilt device, by means of which the workpiece spindle of a transport carriage, at least in the particular portion, can be moved into the particular position and back again into the conveying position.

A variant consists in that the tilt device comprises a tilt rail, which is disposed in the particular portion and on which transport carriages are movable, and which, by means of a drive, can be pivoted about a pivot axis extending parallel to the transporting direction. Thus, when a transport carriage is located in the tilt rail, the transport carriage can be tilted together with the tilt rail, such that its workpiece spindle is inclined sideways.

It is advantageous in this case if the tilt device comprises a separate drive for transport carriages, by means of which drive transport carriages that are located in the particular portion can be driven independently of transport carriages not located in the particular portion. In particular, in the case of such a tilt device, cleaning is effected intermittently, such that the transport carriages having a workpiece spindle to be cleaned have to be electively stopped and driven, which can be more easily achieved with a separate drive than by use of the drive in the other regions of the rail system.

To enable transport carriages to pass continuously through the particular portion, the tilt device can alternatively be constituted by a twist portion of the supporting rail, in which at least a guide profile of the supporting rail that guides the running gear of the transport carriages is twisted such that transport carriages are tilted sideways as they pass through the twist portion, until their workpiece spindle assumes its particular position.

It may be advantageous in this case if the supporting rail comprises a profile pair, consisting of a guide profile for the running gear of the transport carriages and of a guide profile for a drive chain, the guide profiles each being twisted in themselves and as a profile pair, such that transport carriages, as they pass through the twist portion, are tilted sideways until their workpiece spindle assumes its particular position.

As a further alternative, the tilt device may be realized as a joint, by means of which the workpiece spindle is mounted on the running gear of the transport carriage, such that the workpiece spindle can be folded out of the conveying position, about a pivot axis extending parallel to the transporting direction, into the particular position. In this case, the alignment of the workpiece spindle can be defined, for example, by a link guide.

With regard to the plant of the type stated at the outset, the above-mentioned object may be achieved in that the conveying system is a spindle conveyor having some or all of the features explained above.

The advantages in this case correspond analogously to the advantages, explained above, relating to the spindle conveyor.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention are explained more fully in the following on the basis of the drawings, wherein:

FIG. 2 shows a section of the cleaning zone from FIG. 1, along the section line II-II therein, as viewed contrary to a transporting direction, in the direction of an intake portion of a supporting rail of the rail system, which intake portion opens into a cleaning region;

FIG. 3 shows a section of the cleaning zone from FIG. 1, along the section line III-III therein, as viewed contrary to the transporting direction, in the direction of a tilt device having a tilt rail that can be tilted sideways in the cleaning region of the cleaning zone;

FIG. 4 shows a section, corresponding to FIG. 3, through the cleaning zone, with a tilt rail, which guides a transport carriage, having been inclined sideways by 90°;

FIGS. 5 to 7 show successive sections of a partial-twist portion of the supporting rail in the cleaning region of a spindle conveyor, according to a second exemplary embodiment;

FIGS. 8 to 10 show successive sections of a full-twist portion of the supporting rail in the cleaning region of a spindle conveyor, according to a third exemplary embodiment;

FIGS. 11 to 13 show differing phases of a transport carriage having a workpiece spindle, mounted in a foldable manner, when being folded down from a conveying position into a cleaning position.

DETAILED DESCRIPTION OF THE PRESENT INVENTION

Figure 1:
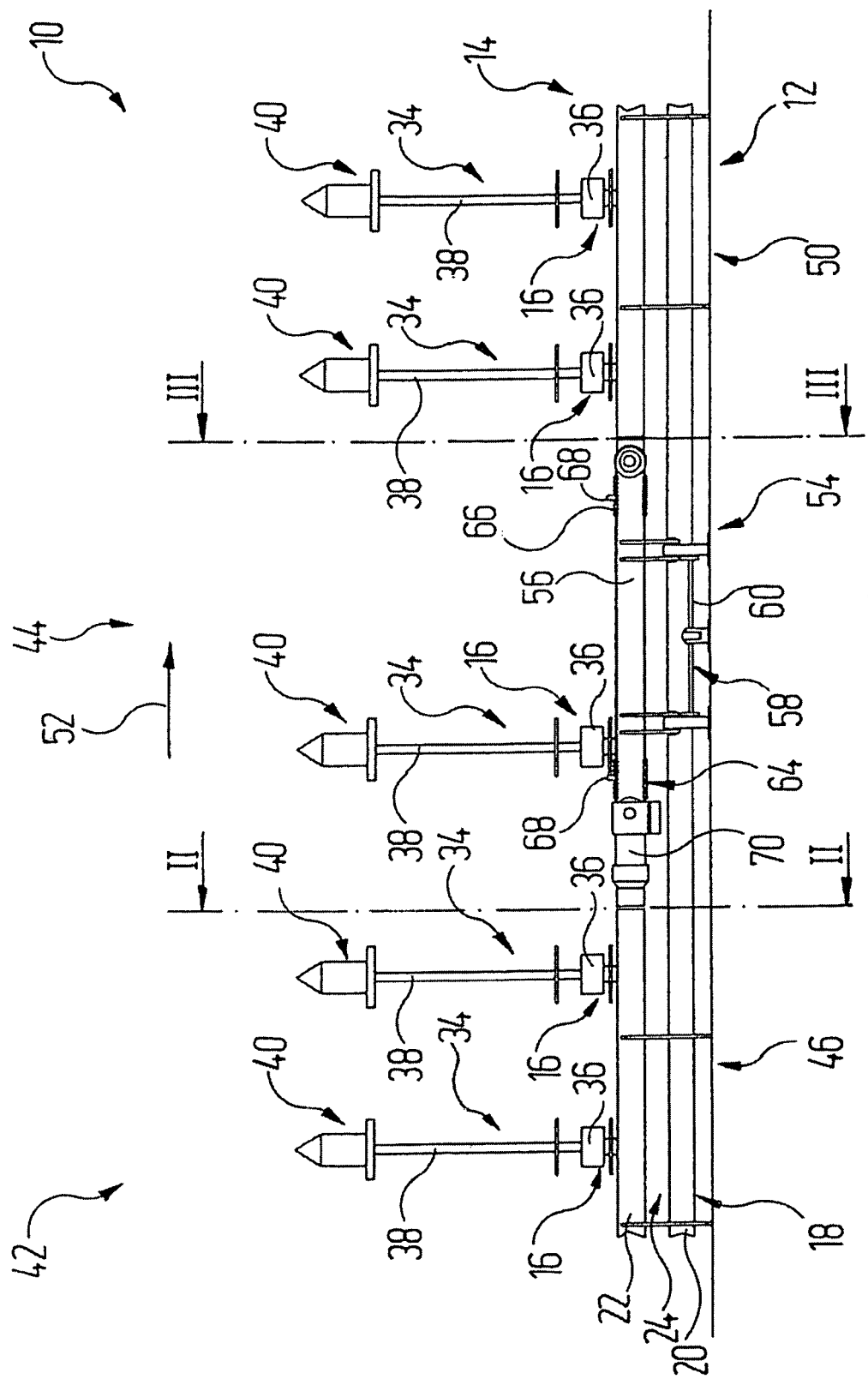
FIG. 1 shows a side view of a cleaning zone of a floor-guided spindle conveyor, having transport carriages, which travel on a rail system and which each carry along a tool spindle.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In FIG. 1, the reference numeral 10 denotes as a whole a surface treatment plant in which workpieces, not shown specifically, are moved through the plant 10 by means of a conveying system in the form of a floor-guided spindle conveyor 12. The spindle conveyor 12 comprises a rail system 14, on which a multiplicity of transport carriages 16, which are loaded with one or more workpieces, are guided through a plurality of successive treatment stations, in which, for example, the workpieces are provided with a coating in a plurality of steps. More precise details relating to the treatment stations are not of interest here, for which reason this is not described further.

The transport carriages 16 run in a single-track supporting rail 18, which comprises a lower guide profile 20 and, running vertically above the latter, an upper guide profile 22, which guide profiles are anchored to the floor of the plant 10 by means of a plurality of retaining plates, which are not specifically denoted by a reference numeral.

A free space, which constitutes a coupling region 24, remains between the guide profiles 20, 22. Running in the lower guide profile 20 of the supporting rail 18 there is an endless drive chain 26 that, as an endless drive means, carries along a multiplicity of drivers 28. The drivers 28 project upwards away from the drive chain 26 and into the coupling region 24 of the supporting rail 18.

Running in the upper guide profile 22 of the supporting rail 18 there is a running gear 30 of the transport carriage 16 that, for this purpose, supports load-bearing running rollers, in a manner known per se, and that, likewise in a manner known per se, is stabilized by guide rollers, both against tilting in the direction of travel and against tilting sideways.

The running gear 30 carries a coupling connector piece 32, which projects downwards into the coupling region 24 of the supporting rail 18, such that one of the drivers 28 of the drive chain 26 can impinge against the coupling connector piece 32, as a result of which the transport carriage 16 is carried along by the revolving drive chain 26.

The running gear 30 carries along a carrying device 34 for the workpieces. This carrying device comprises a bearing block 36, which is connected to the running gear and supports a workpiece spindle 38 such that the latter is rotatable about its longitudinal axis. The workpiece spindle 38, at its end that is distant from the bearing block 36, has a workpiece receiver 40, which, in the case of the present exemplary embodiment, is realized as a support plate having a hub spike for vehicle wheels.

As mentioned above, the workpiece spindles 38 are also at least partially wetted when, in the treatment stations of the surface treatment plant 10, coating is applied to the workpieces conveyed by the spindle conveyor 12, and they have to be cleaned from time to time.

For this purpose, the spindle conveyor 12 comprises a cleaning zone 42 for the workpiece spindles 38, which cleaning zone, as a particular portion of the spindle conveyor 12, comprises a cleaning region 44 to which the unladen transport carriages 16 to be cleaned are supplied, via an intake portion 46 of the supporting rail 18. In the cleaning region 44 there is a cleaning station 48, which, in the case of the present exemplary embodiment, is realized as a spraying unit, by means of which a cleaning solution can be sprayed. Adjoining the cleaning region 44 is a discharge portion 50 of the supporting rail 18, via which the transport carriages 16, with now cleaned workpiece spindles 38, are guided from the cleaning region 44 to a drying region, not shown specifically, and leave the cleaning zone 42. In the drying region, the cleaned workpiece spindles 38 are blown dry, for example by means of compressed air.

When the transport carriages 16 are travelling through the treatment stations of the surface treatment plant 10 or are located in the intake portion 46 or in the discharge portion 50 of the supporting rail 18, the workpiece spindles 38 assume a conveying position. In the case of the present exemplary embodiment, the longitudinal axis of the workpiece spindles 38 runs vertically when in the conveying position.

By contrast, as can be seen in FIG. 4, in the cleaning region 44 the workpiece spindles 38 are cleaned in a particular position, which differs from the conveying position. In the following, this particular position is referred to as the cleaning position.

In this cleaning position, the workpiece spindle 38 of a transport carriage 16 is tilted with respect to a vertical plane V, which is parallel to a transporting direction 52, in which the transport carriages 16 are guided through the cleaning region 44 of the cleaning zone 42. The transporting direction 52 is indicated only in FIG. 1.

A tilt device 54 is provided to enable the workpiece spindles 38 to assume their cleaning position. In the case of the present exemplary embodiment, the tilt device 54 comprises a tilt rail 56 for the running gear 30 of the transport carriages 16, which tilt rail is realized so as to complement the upper guide profile 22 of the supporting rail 18, and which is disposed in the cleaning region 44 of the cleaning zone 42, between the intake portion 46 and the discharge portion 50 of the supporting rail 18. When in a standard conveying position, the tilt rail 56 of the tilt device 54 is in flush alignment with the upper guide profile 22, both of the intake portion 46 and of the discharge portion 50 of the supporting rail 18. The tilt rail 56 is anchored to the floor of the plant 10 via a joint unit 58, and can be sideways tilted as a whole out of this standard conveying position, about a horizontal pivot axis 60, into a tilted position, in which it is still parallel to the transport direction 52.

For this purpose, the pivot rail 56 of the tilt device 54 is coupled to a cylinder drive 62, which may be operated, for example, pneumatically or hydraulically. When the tilt rail 56 of the tilt device 54 is tilted, it concomitantly moves a transport carriage 16 guided therein, such that the workpiece spindle 38 thereof can thereby be brought into the cleaning position, tilted with respect to the vertical plane V.

For the purpose of driving a transport carriage 16 in the cleaning region 44, the tilt device 54 has its own chain drive 64, having a revolving chain 66 that is guided along the tilt rail 56. The chain 66 carries a plurality of drivers 68, which can be in contact with the running gear 30 of the transport carriages 16, as a result of which a transport carriage 16 is conveyed through the cleaning region 44 and the cleaning station 48 when the chain 66 revolves. The chain 66 is coupled to a drive 70. The chain drive 64 enables transport carriages 16 located in the cleaning region 44 to be driven independently of transport carriages 16 not located in the cleaning region 44.

In the case of the present exemplary embodiment, the longitudinal axis of the workpiece spindle 38 extends horizontally when in the cleaning position, for which purpose the tilt rail 56 is correspondingly tilted sideways by 90°. However, it may suffice for the workpiece spindle 38 to be merely inclined in relation to a horizontal plane, in order to prevent soiling, e.g. to prevent cleaning solution loaded with coating residues that drip down from the workpiece spindle 38 during the cleaning operation, from falling on to the transport carriage 16 or on to the rail system 14.

A transport carriage 16 with a workpiece spindle 38 to be cleaned is thus guided, via the intake portion 46 of the supporting rail 18, to the cleaning region 44 of the cleaning zone 42. The transport carriage 16 is transferred to the tilt rail 56 in that, just before the tilt device 54, the drive chain 26 is guided away sideways from the intake portion 46; the drive chain 26 is then guided past the cleaning region 44 and to the discharge portion 50 of the supporting rail 18.

The transport carriage 16 travels freely and initially without drive into the tilt rail 56, until it runs on to a driver 68 of the chain 66, which, in the case of a deactivated drive 70, is initially at a standstill. The transport carriage 16 is thereby stopped in its movement.

The tilt rail 56 is then tilted, together with the transport carriage 16, by means of the cylinder drive 62, and the transport carriage 16 is conveyed, in its now tilted orientation, along the tilt rail 56 to the cleaning station 48, in that the drive 70 for the chain 64 is activated.

After the workpiece spindle 38 has been cleaned in the cleaning station 48 and has been moved out of the cleaning station 48, the chain drive 70 is deactivated and the tilt rail 56 is moved back into its standard conveying position. The chain drive 70 is then reactivated, as a result of which the transport carriage 16 is pushed out of the tilt rail 56 and moves into the discharge portion 50 of the supporting rail 18, where it is taken up by the drive chain 26 and returned back into the treatment circuit of the workpieces.

Altogether, therefore, in the cleaning of the workpiece spindles 38 the cleaning sequence is intermittent in the case of the tilt device 54. As long as the transport carriages 16 are located on the tilt rail 56, they can nevertheless be conveyed continuously through the cleaning station 48.

FIGS. 5 to 7 show, as a second exemplary embodiment, a modified spindle conveyor 12 that allows the transport carriages 16 to move continuously through the cleaning region 44, and in which components that correspond to the components already explained above are denoted by the same reference numerals.

In the case of this spindle conveyor 12, the tilt device 54 in the cleaning region 44 does not have a tilt rail 56 that is separate from the supporting rail 18. Rather, the tilt device 54 is realized in that the supporting rail 18 in the cleaning region 44 has a partial-twist portion 72. This partial-twist portion 72 of the supporting rail 18 is distinguished in that the lower guide profile 20, with the drive chain 26, is routed on in an unchanged manner from the intake portion 46 to the discharge portion 50 of the supporting rail 18, whereas the upper guide profile 22 of the supporting rail 18 is initially twisted in the longitudinal direction, and is offset sideways, in a slight arc with respect to the lower guide profile 20, and routed downwards.

The course and geometry of the upper guide profile 22 of the supporting rail 18 in this case are such that, on the one hand, the coupling connector piece 32 of a transport carriage 16 located in the partial-twist portion 72 can always remain in contact with one of the drivers 28 of the drive chain 26 and, on the other hand, the transport carriage 16 is tilted as a unit as it passes through the partial-twist portion 72, until its workpiece spindle 38 assumes its cleaning position.

As clearly shown by FIG. 7, in the case of this exemplary embodiment the longitudinal axis of the workpiece spindle 38 is not horizontal when in the cleaning position. However, the workpiece spindle 38 is tilted to such an extent with respect to the vertical plane V, that no soiling that drips down can come into contact with the transport carriage 16 or the rail system 14. If appropriate, however, the upper guide profile 22 of the supporting rail 18 can also be twisted further, until the workpiece spindle 38 is aligned horizontally at the lowest point.

The upper guide profile 22 of the supporting rail 18 maintains this twisted configuration over a partial portion that goes through the cleaning station 48. After this, the upper guide profile 22 of the supporting rail 18 is twisted back and, in a corresponding slight arc, is routed back upwards and inwards, until the upper guide profile 22 in the partial-twist portion 72 of the supporting rail 18 again has the same configuration and position, with respect to the lower guide profile 20, as the upper guide profile 22 in the discharge portion 50 of the supporting rail 18.

In the cleaning region 44, the upper guide profile 22 and the lower guide profile 20 of the supporting rail are again held in position by retaining plates, denoted here by the reference numeral 74, which are matched to the course and alignment of the two guide profiles 20 and 22 relative to each other.

In the case of this exemplary embodiment of the spindle conveyor 12, transport carriages 16 that have a workpiece spindle 38 to be cleaned run, without stoppage, out of the intake portion of the supporting rail 18 and into the partial-twist portion 72 thereof, are guided through this partial-twist portion, being tilted sideways and pivoted back again, in order, likewise, to run continuously into the discharge portion 50 of the supporting rail 18 and conveyed on from there. In this case, one and the same driver 28 of the drive chain 26 can always be in contact with the coupling connector piece 32 of a particular transport carriage 16.

To enable the running gear 30 of the transport carriages 16 to travel through the twisted upper guide profile 22, its running rollers and guide rollers are, for example, spring-mounted, such that they have a sufficient movement clearance and can follow the twist of the upper guide profile 22, without the running gear 30 losing its overall stability.

FIGS. 8 to 10 show, as a third exemplary embodiment, a spindle conveyor 12, which has again been modified and which likewise allows the transport carriages 16 to move continuously through the cleaning region 44, and in which components that correspond to the components and structural parts already explained above are denoted by the same reference numerals.

In the case of this spindle conveyor 12, the tilt device 54 is realized in that the supporting rail 18 in the cleaning region 44 of the cleaning zone 42 has a full-twist portion 76. In contrast to the partial-twist portion 72 explained above, this full-twist portion 76 of the supporting rail 18 is distinguished in that the upper guide profile 22 and the lower guide profile 20 are in themselves twisted and, at the same time, constitute a profile pair that is additionally twisted as a unit.

In this case, the upper guide profile 22 of the supporting rail 18 is routed and twisted in the same manner as in the case of the upper guide profile 22 of the supporting rail 18 in the partial-twist portion 72 according to FIGS. 5 to 7. The lower guide profile 20 of the supporting rail 18, by contrast, in the full-twist portion 76 thereof, is merely twisted about its longitudinal axis, without being offset laterally or vertically.

In the case of this twisted configuration of the supporting rail 18, likewise, the coupling connector piece 32 of a transport carriage 16 located in the full-twist portion 76 can always remain in contact with one of the drivers 28 of the drive chain 26, the transport carriage 16 being tilted as a unit as it passes through the full-twist portion 76, until its workpiece spindle 38 assumes its cleaning position. In the case of this exemplary embodiment, the drive chain 26 must be realized, correspondingly, in such a manner that it can be twisted in the longitudinal direction, in order that its drivers 28 can always remain in bearing contact with the coupling connector pieces 32 of the transport carriages 16.

As shown by FIG. 10, in the case of this exemplary embodiment the longitudinal axis of the workpiece spindle 38 is again horizontal when in the cleaning position.

The supporting rail 18 again maintains the twisted configuration over a partial portion that is routed through the cleaning station 48. After this, the supporting rail 18 is again twisted back into its standard configuration, i.e. its twist is removed. In the standard configuration, it then merges into the discharge portion 50.

In the case of this exemplary embodiment, likewise, the upper guide profile 22 and the lower guide profile 20 of the supporting rail in the cleaning region are held in position by retaining plates 74, which are matched to the course and alignment of the two guide profiles 20 and 22 relative to each other.

FIGS. 11 to 13 show, as a fourth exemplary embodiment, a spindle conveyor 12, which has once again been modified and which likewise allows the transport carriages 16 to move to continuously through the cleaning region 44, and in which components and structural parts already explained above are again denoted by the same reference numerals.

In this case, the supporting rail 18 in the cleaning region 44 of the cleaning zone 42 is realized with the same structure as in the intake portion 46 and in the discharge portion 50. Likewise, the drive chain 26 is guided, without modification, out of the intake portion 46 by the supporting rail 18, and into the discharge portion 50.

In order that the workpiece spindle 38 of a transport carriage 16 can now assume its cleaning position, the tilt device 54 is constituted in that the workpiece spindle 38, at its lower end that is distant from the workpiece receiver 40, is coupled to the running gear 30 of the transport carriage 16, via a joint 78. At the joint 78, the workpiece spindle 38 can be folded sideways about a pivot axis 80, which is parallel to the transporting direction 52, as illustrated in FIGS. 12 and 13.

For this purpose, there may be, for example, a link guide, not shown specifically, which is next to and parallel to the supporting rail 18, and by means of which the workpiece spindle 38 executes the folding movement under constraint when a transport carriage 16 is conveyed through the cleaning region 44.

Correspondingly, each workpiece spindle 38, after passing through the cleaning station 48, may be righted back to its vertical conveying position by a similar link guide.

During the cleaning operation, the workpiece spindles 38 may be rotated about their longitudinal axis.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A spindle conveyor for conveying workpieces comprising:
   a) a rail system which comprises at least one supporting rail;
   b) a plurality of transport carriages, which each comprise a running gear that is movable on the supporting rail in a transporting direction and a carrying device for workpieces that are carried along by the running gear;
   c) the carrying device comprising at least one workpiece spindle for receiving the workpiece, wherein
   d) the workpiece spindle of a transport carriage located on the rail system is pivotable, at least in a particular portion of the spindle conveyor, between a conveying position and a particular position that is different from the conveying position;

e) the workpiece spindle, when in the particular position, is tilted with respect to a vertical plane (V) that extends parallel to the transporting direction,
wherein the particular portion of the rail system is a cleaning region, in which a cleaning device is disposed which cleans the workpiece spindles of the transport carriages, and wherein the particular position of the workpiece spindle is a cleaning position.

2. The spindle conveyor according to claim 1, further comprising: a tilt device which moves the workpiece spindle of a transport carriage, at least in the particular portion, into the particular position and back into the conveying position.

3. The spindle conveyor according to claim 2, wherein the tilt device comprises a tilt rail, which is disposed in the particular portion and on which transport carriages are movable, and which can be pivoted by a drive about a pivot axis extending parallel to the transporting direction.

4. The spindle conveyor according to claim 2, wherein the tilt device comprises a separate drive for transport which drive transport carriages that are located in the particular portion independently of transport carriages not located in the particular portion.

5. The spindle conveyor according to claim 2, wherein the tilt device is constituted by a twist portion of the supporting rail, in which at least a guide profile of the supporting rail that guides the running gear of the transport carriages is twisted such that transport carriages are tilted sideways as the transport carriages pass through the twist portion, until their workpiece spindles each assumes its particular position.

6. The spindle conveyor according to claim 5, wherein the supporting rail comprises a profile pair, including a guide profile for the running gear of the transport carriages and of a guide profile for a drive chain, the guide profiles each being twisted in themselves and as a profile pair, such that transport carriages, as they pass through the twist portion, are tilted sideways until their workpiece spindles each assumes its particular position.

7. The spindle conveyor according to claim 2, wherein the tilt device comprises: a joint, by which the workpiece spindle is mounted on the running gear of the transport carriage, such that the workpiece spindle can be folded out of the conveying position, about a pivot axis extending parallel to the transporting direction, into the particular position.

8. A plant for treating workpieces comprising:
a conveying system which conveyes the workpieces through the plant, wherein the conveying system is a spindle conveyor according to claim 1.

9. A spindle conveyor for conveying workpieces comprising:
a) a rail system which comprises at least one supporting rail;
b) a plurality of transport carriages, which each comprise a running gear that is movable on the supporting rail in a transporting direction and a carrying device for workpieces that are carried along by the running gear;
c) the carrying device comprising at least one workpiece spindle for receiving the workpiece, wherein
d) the workpiece spindle of a transport carriage located on the rail system is pivotable, at least in a particular portion of the spindle conveyor, between a conveying position and a particular position that is different from the conveying position;
e) the workpiece spindle, when in the particular position, is tilted with respect to a vertical plane (V) that extends parallel to the transporting direction;
f) a tilt device which moves the workpiece spindle of a transport carriage, at least in the particular portion, into the particular position and back into the conveying position, wherein the tilt device comprises a tilt rail, which is disposed in the particular portion and on which transport carriages are movable, and which can be pivoted by a drive about a pivot axis extending parallel to the transporting direction.

10. A spindle conveyor for conveying workpieces comprising:
a) a rail system which comprises at least one supporting rail;
b) a plurality of transport carriages, which each comprise a running gear that is movable on the supporting rail in a transporting direction and a carrying device for workpieces that are carried along by the running gear;
c) the carrying device comprising at least one workpiece spindle for receiving the workpiece, wherein
d) the workpiece spindle of a transport carriage located on the rail system is pivotable, at least in a particular portion of the spindle conveyor, between a conveying position and a particular position that is different from the conveying position;
e) the workpiece spindle, when in the particular position, is tilted with respect to a vertical plane (V) that extends parallel to the transporting direction;
f) a tilt device which moves the workpiece spindle of a transport carriage, at least in the particular portion, into the particular position and back into the conveying position,
wherein the tilt device is constituted by a twist portion of the supporting rail, in which at least a guide profile of the supporting rail that guides the running gear of the transport carriages is twisted such that transport carriages are tilted sideways as the transport carriages pass through the twist portion, until their workpiece spindles each assumes its particular position, and
further wherein the supporting rail comprises a profile pair, including a guide profile for the running gear of the transport carriages and of a guide profile for a drive chain, the guide profiles each being twisted in themselves and as a profile pair, such that transport carriages, as they pass through the twist portion, are tilted sideways until their workpiece spindles each assumes its particular position.

* * * * *